Jan. 13, 1959     H. W. WEBER     2,868,009
SUSPENDED FURNACE WALL CONSTRUCTION
Filed Nov. 26, 1954     3 Sheets-Sheet 1
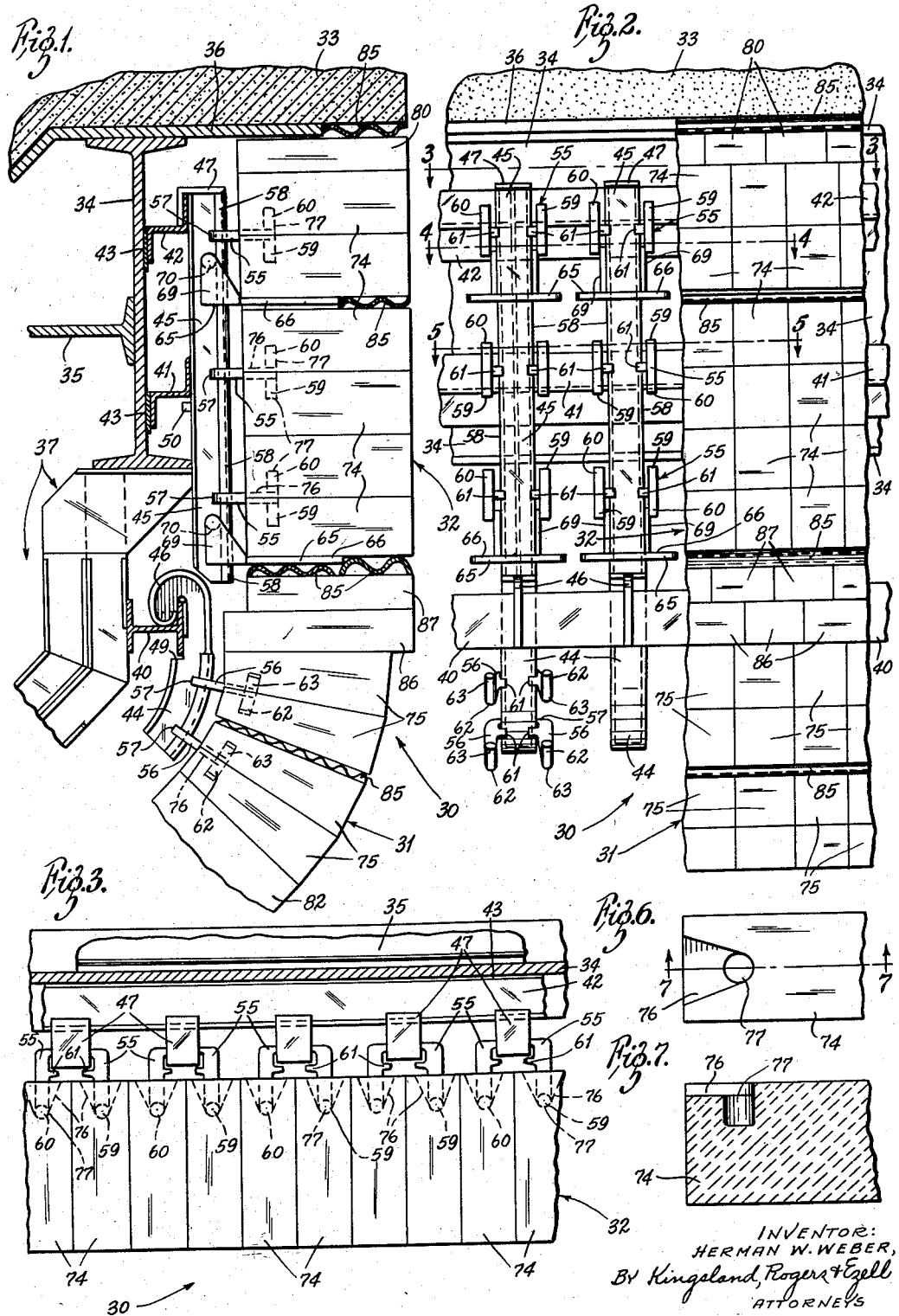
INVENTOR:
HERMAN W. WEBER,
By Kingsland, Rogers & Ezell
ATTORNEYS

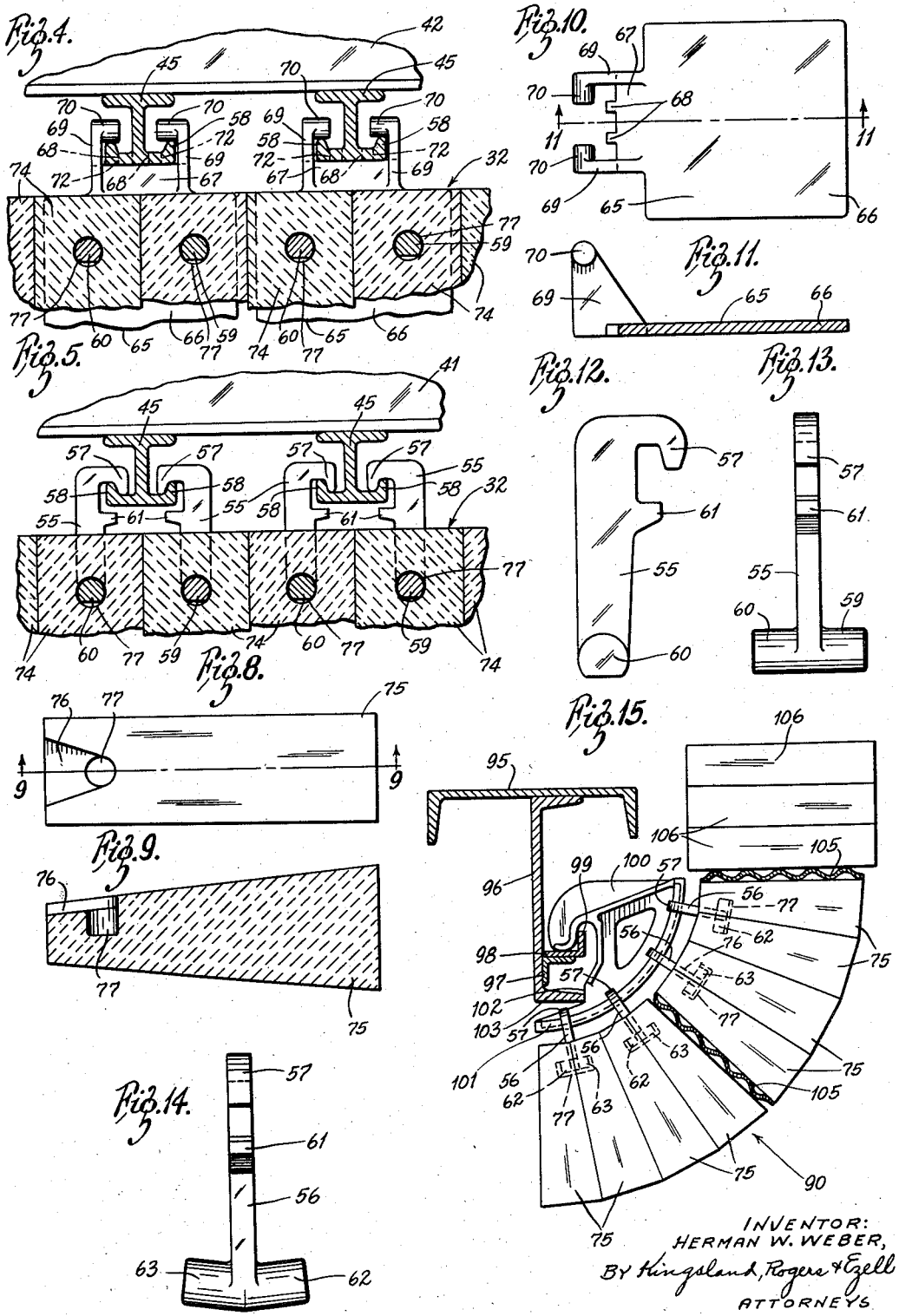

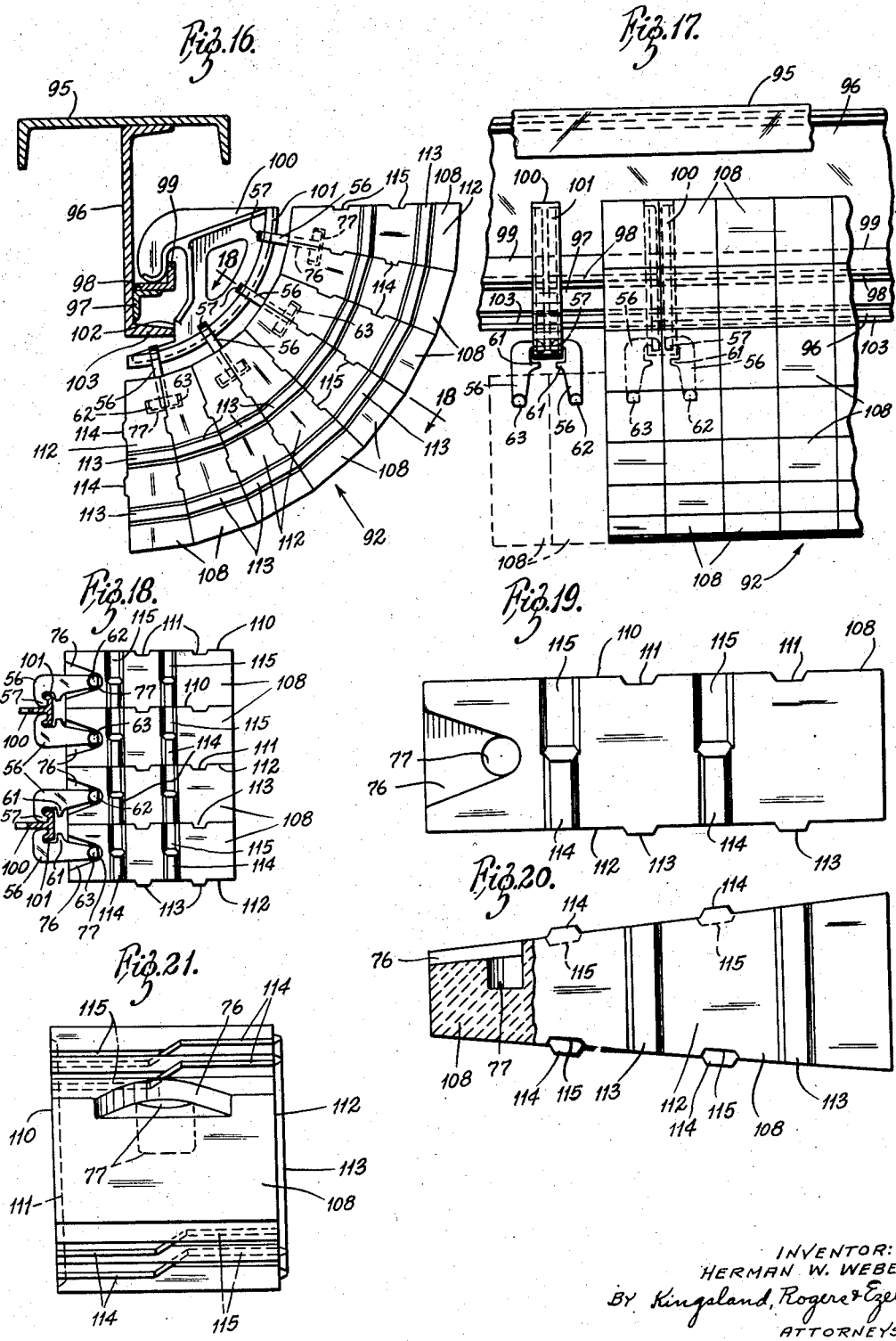

United States Patent Office 2,868,009
Patented Jan. 13, 1959

2,868,009

SUSPENDED FURNACE WALL CONSTRUCTION

Herman W. Weber, Richmond Heights, Mo., assignor to Laclede-Christy Company, St. Louis, Mo., a corporation of Missouri Application November 26, 1954, Serial No. 471,411

2 Claims. (Cl. 72—101)

The present invention relates generally to suspended refractory linings for furnaces, and more particularly to a novel arrangement of ceramic tiles and supports therefor which adds materially to the flexibility of choice of refractory materials for use in the furnace.

It has been found desirable in certain types of high temperature furnaces, and especially in furnaces which are subjected to erosive gases and slags, to provide refractory tiles of different chemical composition in different portions of the furnace. For example, it may be indicated in a particular instance that maximum furnace life and efficiency will be obtained with a lining comprising acidic material in one part of the furnace and basic material in another part. Thus, the furnace may be lined in part with tiles of high alumina content having a very low coefficient of expansion, and in part with tiles high in magnesite and having a relatively high coefficient of expansion. It is obviously desirable in such a furnace to employ tile shapes and tile suspending structure which together provide maximum flexibility in the installation.

It is an object of the present invention, therefore, to provide a novel suspended furnace wall construction which is inherently adapted to wide ranges of expansion of its refractory elements.

It is another object of the invention to provide a novel furnace wall construction in which corrugated metal plates may be incorporated for sealing expansion joints against excess gas leakage.

It is another object of the invention to provide a novel suspended wall construction employing heat resistive metal title clips, or hangers, said clips or hangers being relatively small and light, thereby contributing to an inherent economy of construction.

It is another object of the invention to provide a novel suspended wall construction in which individual tiles of relatively small size may be mounted singly for expansive movement in a plurality of directions.

It is another object of the invention to provide a novel suspended wall construction in which individual tiles are pivotally supported.

The foregoing, as well as additional objects and advantages, will be evident from the following description taken in conjunction with the accompanying drawings, in which:

Figure 1 is a fragmentary vertical section illustrating one arrangement of ceramic tiles and supporting structure conforming to the teachings of the present invention;

Figure 2 is a fragmentary elevation thereof, part of the tile lining being broken away so as to reveal the supporting structure;

Figure 3 is a horizontal section taken generally along the line 3—3 of Figure 2;

Figure 4 is an enlarged fragmentary section taken generally along the line 4—4 of Figure 2;

Figure 5 is an enlarged fragmentary section taken generally along the line 5—5 of Figure 2;

Figure 6 is a fragmentary top plan view of one of the wall tiles;

Figure 7 is a sectional view taken generally along the line 7—7 of Figure 6;

Figure 8 is a plan view of a removed nose tile;

Figure 9 is a sectional view taken generally along the line 9—9 of Figure 8;

Figure 10 is a plan view of a removed shelf;

Figure 11 is a vertical section taken generally along the line 11—11 of Figure 10;

Figure 12 is a side elevation of a removed wall tile hanger;

Figure 13 is a right end elevation thereof;

Figure 14 is an end elevation of a removed nose tile hanger;

Figure 15 is a vertical section illustrating a suspended nose construction employing refractory tiles having a relatively high coefficient of expansion;

Figure 16 is a vertical section illustrating a nose construction employing refractory tiles having a relatively low coefficient of expansion;

Figure 17 is a fragmentary elevation showing the structure of Figure 16 as viewed from the right, some of the individual tiles being removed so as more clearly to reveal the supporting structure;

Figure 18 is a view taken generally along the line 18—18 of Figure 16;

Figure 19 is a plan view of one of the nose tiles included in the Figure 16 embodiment of the invention;

Figure 20 is a side elevational view, partly in section of said tile; and

Figure 21 is an enlarged left end elevational view thereof.

Considering the drawings more in detail and making use of the reference numerals applied thereto, Figures 1 and 2 show a suspended wall construction 30 which exemplifies one form of the present invention. The illustrated assembly 30 comprises a nose section 31 and a vertical section 32, the assembly comprising the nose and chill wall of an open hearth furnace. The chill wall section 32 is surmounted by a main furnace wall 33, and it will be understood that the general shape of the furnace as defined by these wall sections 31, 32 and 33 is conventional.

The main support for the assembly 30 is provided by a framework of conventional structural steel shapes which, in the illustrated embodiment, includes an I-beam 34 which receives transverse support from another I-beam 35 and which, it will be understood, is otherwise supported in conventional manner. A plate 36 is supported on top of the I-beam 34 and, in turn, supports the masonry wall section 33. Auxiliary structural steel elements are tied into the bottom of the I-beam 34 so as to extend downwardly and outwardly therefrom in a well known manner which adapts them for supporting a suspended lining. These auxiliary steel elements are shown generally as 37.

In addition to the primary structural steel framework abovementioned, structural steel shapes are provided and mounted for the specific purpose of supporting the wall sections 31 and 32. Thus, an H-section 40 is disposed horizontally, with its flanges in parallel vertical planes, and is secured to the steel work 37. Similarly, a pair of Z-sections 41 and 42 are secured in parallel relation against the web of the I-beam 34. Spacer plates 43 may, of course, be employed as needed.

The horizontal supporting elements 40, 41 and 42 are clearly adapted to receive individual, horizontally spaced, vertical runner bars 44 and 45. Preferably, the runner bars 44 and 45 have a cross section as clearly illustrated by the bars 45 in Figures 4 and 5. This cross section is, of course, available through a casting process, or it may be fabricated from standard structural steel shapes. For example, and I-beam could be cut lengthwise in half and welded to the web of a channel to provide the desired cross section.

Due to its arcuate shape, as depicted in Figure 1, the runner bar 44 for the nose section 31 would normally be of cast construction. The arcuate runner bar 44 includes an appropriate hook portion 46 adapted to fit over one of the vertical flanges of the H-section 40 and thus to retain the bar 44 in a fixed suspended position. The bars 45 include a hook portion 47 which may be cast integral with the bar 45 or secured thereto by welding.

Figure 1 clearly shows the manner in which the runner bars 44 and 45 are mounted. For a relatively short runner bar, such as the bar 44, lateral support as well as vertical support is preferably provided in the engagement of the hook portion 46 with the supporting steel section 40. This calls for the hook portion 46 to be provided with a suitable bearing surface for abutment with the outside flange surface of the H-section 40. Where the runner bar is relatively long, as is the illustrated bar 45, lateral support is preferably provided by abutment of the runner bar with an additional supporting element such as the Z-section 41. It will be noted that the runner bar 44 is formed with a slight ledge or shelf 49 which effectively prevents it from being inadvertently lifted from its support. A lug 50 is secured in appropriate position on the runner bar 45 for a similar purpose.

Whereas the runner bars 44 and 45 are clearly disposed in positions where they are adequately ventilated, and hence are not subjected to very high temperatures, the refractory lining of the wall sections 31 and 32 is directly supported by clips or hangers 55 and 56 which are preferably of heat-resisting metal. The hangers 55, shown in Figures 12 and 13, include an extended hook 57 adapted to be engaged over a flange 58 formed on a runner bar 45, as clearly shown in Figure 5. The other end of the hanger 55 is formed to provide oppositely extending generally cylindrical lugs 59 and 60 disposed in a direction which is transverse to the plane of the hook portion 57. Preferably, the hangers 55 are also provided with an intermediate lug 61 by means of which they may be wedged in a desired position relative to the runner bar 45. It is clear from Figure 5 that insertion of a flat wedge-like object between the lug 61 and the lower surface of the runner bar 45 would effectively position the hanger 55 in the absence of other elements to serve this purpose.

A hanger 56 is shown removed in Figure 14, and it will be seen that generally cylindrical lugs 62 and 63 on the hanger 56 are disposed at less than right angle in relation to the upstanding hook portion 57. In all other respects, the hangers 56 and 55 are identical.

Figures 10 and 11 depict a shelf bracket 65, a plurality of which contributes to the support of the refractory lining in the wall section 32. Each shelf bracket 65 includes a plate-like shelf portion 66, generally rectangular in form, but extended at one side to form a brace portion 67 having a pair of nibs 68 projecting from the edge thereof. A pair of mounting lugs 69 disposed in parallel, one on either side of the brace portion 67, are provided in upstanding relation to the shelf portion 66, as clearly illustrated in Figure 11. Each of the lugs 69 has an inwardly extending portion 70 which functions as a hook in mounting the bracket 65. The shelf brackets 65, like the hangers 55 and 56, are of heat-resisting metal, and are supported by the runner bars 45 in the manner clearly illustrated in Figure 4. From this figure, it will be seen that the runner bars 45 are provided with pairs of apertures 72 which receive the nibs 68 and permit the brace portion 67 to abut the outer surface of the channel portion of the runner bar 45. The mounting lugs 69 flank this channel portion and the extensions 70 hook over the flanges of the channel.

The refractory lining of the nose and chill wall arrangement shown in Figures 1 and 2 comprises ceramic tiles of different shapes. Thus, the wall section 32 includes tiles 74 having a rectangular block-like shape, whereas the nose section 31 has tiles 75 which are tapered, as clearly shown in Figure 9. Both the tiles 74 and 75 are solid and have smooth planar exterior surfaces, except for a tapered recess 76 and a cylindrical cavity 77 formed as clearly illustrated in the Figures 6 through 9.

Although it is to be understood that the tiles 74 and 75 may be of either acid or basic composition, it is assumed, for the purpose of the instant illustration, that these tiles have a relatively high magnesite content and are, hence, predominantly basic. Inasmuch as basic tiles are generally not very strong structurally, it is not unusual for such tiles to be encased in sheet steel, and the tiles 74 and 75 may, of course, be so constructed.

It is well known in the furnace refractory art that basic tiles have a relatively high coefficient of expansion and that linings which include basic tiles must, therefore, be provided with sufficient free space to accommodate the expansion of the tiles when heated. Thus, it will be observed that the tiles 74 in the chill wall section 32 are disposed so as to leave a substantial space between adjacent horizontal rows of tiles at frequent intervals. These spaces or expansion joints are provided in the section 32 from the positioning of the tiles 74 by the shelf bracket 65. In the particular illustration of Figures 1 and 2, the lower shelf bracket 65 supports a stack of four tiles 74, and the upper shelf bracket 65 supports a stack of two tiles 74 and a brick 80.

Although there are no shelf brackets 65 shown for support of the nose section 31, it is obvious that such could have been included. It is assumed, however, for the purposes of the present illustration, that the tiles 75 receive support from a lower extension 82 of the nose section 31, and that they also receive direct support from the hangers 56. It is clear from the illustration of Figure 1 that the tapered form of the tiles 75 permits them to be assembled in a generally arcuate pattern, and, further, that the angular relation of the lugs 62 and 63 with respect to the hook portion 57 of the hangers 56 contributes to the efficient support of the tiles 75 in their arcuate pattern.

Inasmuch as the multiplicity and the size of the required expansion joints in a refractory lining of basic tiles often present a substantial leakage problem, it is preferred to provide the expansion joints with a compressible medium adapted to prevent substantial leakage of gases therethrough, and, at the same time, to give way to expansion of the tile lining. Thus, in the illustrated construction, corrugated metallic sheets designated generally by the numeral 85 are disposed in these expansion joints. The well known affinity of magnesite tile for iron causes the metal sheets 85 to be partially absorbed into the tile when the furnace is heated.

In instances where standard tile and brick dimensions tend to leave abnormal spaces between adjacent courses, corrugated sheets of different sizes may be employed. Such an instance is illustrated in Figure 1 where standard bricks 86 and 87 leave a somewhat larger than normal space between the brick 87 and the superimposed wall section 32. In this instance, two different sizes of corrugated metal are employed, as illustrated. Also illustrated in Figure 1 is the establishment of an expansion joint in the nose section 31, the upper tiles being supported directly upon the corrugated metal sheet 85 at this point.

The flexibility of construction achieved through the present invention is well illustrated through a comparison of the illustrations of Figures 15 and 16. These figures depict nose sections 90 and 92, respectively, which nose sections may be considered to be interchangeable in a given furnace. Thus, in each of the Figures 15 and 16, there is shown identical supporting structure including horizontally disposed channel sections 95 and 96, the latter having angle members 97 and 98 secured thereto in a manner to provide an upstanding flange 99 for interlockingly receiving spaced runner brackets 100. It will be readily understood that the runner brackets 100 have arcuate runner portions 101 which include a channel-like cross section similar to that above described in respect to the runner bars 45. In addition, each runner bracket 100 is provided with an edge surface 102 for abutment with a flange 103 of the channel 96. Finally, each of the nose sections 90 and 92 includes a plurality of hangers 56 as previously described.

It will be seen from the foregoing that any difference between the nose sections 90 and 92 must necessarily be in the refractory lining itself, and this is, of course, borne out by the illustrations of Figures 15 and 16. The refractory lining of the nose section 90 is comprised of tiles 75 having basic composition, as previously described. The tiles 75 are separated into groups to provide necessary expansion joints which are then filled with corrugated metal sheets 105. Preferably, there is an expansion joint and a sheet 105 for each forty-five degrees of the arcuate nose section 90. In the illustration, the upper sheet 105 fills the expansion joint between the top of the nose section 90 and a plurality of superimposed tiles 106.

Directing attention now to the nose section 92 shown in Figure 16, it will be observed that the nose section 92 includes tiles 108 which are in consecutive abutment without expansion joints. It will also be observed that the tiles 108, while having the same general over-all shape as the tiles 75, are provided with interlocking tongues and grooves on the four side faces. It will be appreciated that the reason for the differences between the tiles 108 and 75 lies in the different chemical composition, the tiles 108 being assumed to have a relatively high alumina content and being, therefore, chemically acid. Tiles of the latter type have a relatively small coefficient of expansion and it is, therefore, not necessary to provide anywhere near the expansion space required for basic tiles. Inasmuch as the low expansion of acid tiles does not ordinarily affect the tight bond between adjacent tiles, improved sealing of the furnace enclosure is dependent upon the interlocking construction illustrated. Figures 17 and 18 show additional views of the nose section 92 and illustrate clearly the similarity in suspension of the tiles 108 and the tiles 75, as well as the interlocking relation of the tiles 108.

Figures 19, 20 and 21 depict the over-all shape of the tiles 108 and show the recess 76 and cavity 77 therein. In addition, these figures illustrate the interlocking tongues and grooves of the tiles 108, and it will be noted that the tonguing and grooving of the converging sides of the tile 108 are different than that of the parallel sides. Thus, one parallel side 110 is provided with continuous grooves 111, whereas the opposite parallel side 112 has continuous tongues 113. Each of the converging sides, however, has a pair of parallel tongues 114 which extend halfway across the face, and a pair of parallel grooves 115 which extend the remaining distance across the face. Clearly, this tonguing and grooving arrangement of the converging faces of the tiles 108 enables the tiles to mate in either face-to-face or back-to-back relation as illustrated in Figure 16. It also enables the several tiles of a course to be in side-by-side interlocking abutment as illustrated in Figure 18, although it is apparent that alternate courses of the tiles 108 will have their tongues 113 disposed in opposite directions.

The above-described arrangement, wherein the lugs of the tile hangers lie in a plane parallel to the runner bars, enables the tiles to be individually engaged on the hanger, whereas, with conventional transverse arrangements, the tiles must be handled in pairs. The pivotal hanging of the individual tiles also provides much greater than conventional freedom for transverse movement of the tiles.

Clearly, there has been described a suspended furnace wall construction which fulfills the objects and advantages sought therefor.

It is to be understood that the foregoing description and the accompanying drawings have been given only by way of illustration and example. It is further to be understood that changes in the form of the elements, rearrangement of parts, or the substitution of equivalent elements, all of which will be apparent to those skilled in the art, are considered within the scope of the present invention, which is limited only by the claims which follow.

What is claimed is:

1. In a vertical furnace wall, means for supporting identical refractory tiles to accommodate various degrees of both vertical and lateral expansion of the tiles, said supporting means comprising a plurality of runner bars retained in parallel upright position, a plurality of shelves disposed one above another on each of said runner bars, said shelves having individual flat horizontal upper surfaces, vertically disposed refractory tiles supported on said shelves, and a plurality of hangers in removable interlocking engagement with each of said runner bars for retaining said tiles in substantial vertical alignment in a vertical plane parallel to said runner bars, said hangers being disposed in vertically spaced pairs of horizontally opposed hangers on each runner bar, each hanger having individual pivotal engagement with two adjacent tiles, the axis of said pivotal engagement being vertical.

2. In a vertical furnace wall, means for supporting identical refractory tiles to accommodate both vertical and lateral expansion of the tiles including a plurality of runner bars retained in parallel upright positions, at least one shelf member on each runner bar having a flat horizontal upper surface for supportingly receiving refractory tiles, vertically disposed refractory tiles supported on said shelves, and a plurality of hangers in removable interlocking engagement with each of said runner bars for retaining said tiles in substantial vertical alignment in a vertical plane parallel to said runner bars, said hangers being disposed in vertically spaced pairs of horizontally opposed hangers on each runner bar, each hanger having individual pivotal engagement with two adjacent tiles, the axis of said pivotal engagement being vertical.

References Cited in the file of this patent

UNITED STATES PATENTS

| Number | Name | Date |
|---|---|---|
| 1,636,603 | Hamilton | July 19, 1927 |
| 1,678,816 | Kinahan | July 31, 1928 |
| 1,948,798 | Nygaard | Feb. 27, 1934 |
| 1,992,756 | Masterson | Feb. 26, 1935 |
| 2,068,863 | Mannshardt | Jan. 26, 1937 |
| 2,081,417 | Antill | May 25, 1937 |
| 2,127,842 | Hosbein | Aug. 23, 1938 |
| 2,192,642 | Griffith | Mar. 5, 1940 |
| 2,369,100 | Young | Feb. 6, 1945 |
| 2,457,965 | Young | Jan. 4, 1949 |
| 2,547,322 | Hever | Apr. 3, 1951 |
| 2,548,908 | Pollen | Apr. 17, 1951 |
| 2,581,989 | Weber | Jan. 8, 1952 |
| 2,641,207 | Pollen | June 9, 1953 |
| 2,664,837 | Banck | Jan. 5, 1954 |